United States Patent [19]

Ives et al.

[11] 3,954,166
[45] May 4, 1976

[54] TRIPLE TRACK BACON PACKING LINE

[75] Inventors: Donald Charles Alfred Ives, Hemingford Grey; Gerald Harwood, Thetford, both of England

[73] Assignee: Danepak Limited, Thetford, England

[22] Filed: Oct. 8, 1974

[21] Appl. No.: 513,155

[52] U.S. Cl. ................................... 198/39; 177/52; 198/76
[51] Int. Cl.² ........................................ B65B 69/00
[58] Field of Search ............. 198/39, 31 AC, 20 T, 198/76, 79, 81; 177/52, 53; 214/16.4 C

[56] References Cited
UNITED STATES PATENTS

| | | | |
|---|---|---|---|
| 2,889,031 | 6/1959 | Hopkins et al. | 198/39 |
| 3,272,307 | 9/1966 | Waite | 198/31 AC |

Primary Examiner—Evon C. Blunk
Assistant Examiner—Douglas D. Watts
Attorney, Agent, or Firm—Ulle C. Linton

[57] ABSTRACT

This invention is concerned with conveying and weighing of unit packages which are desired to be packed in predetermined weights and is particularly concerned with foodstuffs which are required by law or other rules to be sold in stated weight packages.

The invention provides for a pair of storage conveyors which receive the foodstuffs from an intermittent source of supply of said foodstuff and which ensure a steady and uniform supply of the units of foodstuff to a weighing locality and which furthermore enable an operator to have a visual indication of the necessary make weight pieces of foodstuff in order to bring the packages up to the predetermined weight.

1 Claim, 4 Drawing Figures

TRIPLE TRACK BACON PACKING LINE

This invention is for improvements in or relating to conveying apparatus and is particularly concerned with apparatus for the conveying of foodstuffs wherein packages of foodstuffs are to be made up to a minimum specified weight. It will be appreciated that many foodstuffs are sold in packets of various shapes and sizes and in particular perishable foodstuffs are often sold in packs of clear plastics material from which air has been removed in order to retain the freshness of the foodstuffs within the pack.

Many foodstuffs are of a piecemeal nature such that a given package of foodstuff is made up of individual pieces of the foodstuff itself and in order to comply with Goverment requirements it is necessary to state the net weight of the foodstuff within the package.

In order that manufacturers and suppliers of such foodstuffs properly comply with these requirements, it is necessary to ensure that a sufficient quantity of the foodstuff in question is in the package prior to the sealing of the package. It is therefore necessary to provide a check weighing system and to provide means for adding additional quantities of the foodstuff in question to a unit of foodstuff which is beneath the minimum specified weight before all the foodstuff is placed into the package and sealed.

It will also be appreciated that foodstuffs which are sliced or cut, such as, for example, slices of bacon, which are cut from sides of bacon, it is necessary to convey the foodstuff from a slicing locality to a weighing locality and thence to a packaging locality. It will be appreciated that the time taken to check weigh and to correct a package which is underweight by adding further quantities of the foodstuff and then check weigh to ensure that the added quantities are sufficient to bring the package up to the required minimum weight and thereafter convey the package of correct weight to the packaging locality will take a longer period of time than the formation of the foodstuff itself, particularly if that foodstuff is bacon. In other words, a bacon slicing machine can slice and shingle a side of bacon into packages of approximate desired weight faster than those packages can be checked as being of the minimum predetermined value and corrected by added make weight pieces of foodstuffs thereto.

Accordingly, it is desirable to have means for storing the foodstuff as, for example, bacon shingle and to be able to withdraw from the storage facilities while no slicing is taking place. It is therefore one object of the present invention to provide means in the packaging of foodstuffs of predetermined weight a conveyor storage arrangement whereby the foodstuff to be check weighed and subsequently packaged is always available to the weighing locality and the subequent packaging locality while actual slicing of the bacon may not be taking place.

It is also a further object of the present invention to provide an improved check weighing arrangement for a foodstuff which enables an operator to ascertain whether a package is of the minimum predetermined weight and if not, to indicate within a range of values the amount of foodstuff which must be added. It is a further object of the present invention to provide a check weighing system which gives a visual indication of the range of underweight of a package of foodstuff so as to render it simpler for an operative to add a quantity of foodstuff within the range of underweight so that the package comes up to the predetermined weight.

Further objects of the invention include the provision of a pair of storage conveyors whereby foodstuff such as, for example, a shingle of bacon is fed on to a first conveyor and is progressed along that conveyor at a first speed which is a faster speed to enable the first unit on said conveyor to be progressed to the end in a relatively short period of time but once that first unit has passed a checkpoint and has left the said conveyor, the conveyor then progresses at a second speed which is slower than the first speed so that the said conveyor delivers the packages of foodstuff thereon to a weighing locality at a convenient speed for the operative at said locality.

A further object includes a second conveyor which may be disposed parallel to the first conveyor such that the bacon slicing machine feeds on to a conveyor which feeds either to the upper or to the lower conveyor, means being provided for bringing one only of the two said conveyors into axial alignment with the feed conveyor so that there is always a supply of foodstuff packages on one or other of the conveyors which are discharging to the weighing locality at the further end.

A further object of the invention includes means for automatically displacing the pair of conveyors according to which of the two conveyors is full of packages of foodstuff, thus ensuring that irrespective of the feed conveyor there is always a supply of packages of foodstuffs on one or other of the two conveyors thus providing a continuous discharge to the weighing locality.

The invention includes photoelectric cell devices located at the beginning and end of the two said conveyors which provide for a triggering of electrical circuits to ensure that one of the two conveyors always contains packages of foodstuffs. The invention furthermore provides for a multi-belt conveyor in which a plurality of belts are disposed side by side and parallel to each other but spaced from each other, which belts receive the packages from the storage conveyors and convey the packages to a weighing locality. A weighpan consisting of parallel fingers is located between the spaces separating the belts and means are provided to lift the belts clear of the fingers or to lower beneath the fingers so that a package on the belt is deposited on said fingers. Said fingers are adapted, according to the present invention, to form part of a weighpan, thus ensuring that the packages may be weighed while allowing the conveyor to continue running.

The foregoing and further objects of the present invention will become more readily apparent from a further understanding of the accompanying drawings, in which.

Figure 1:
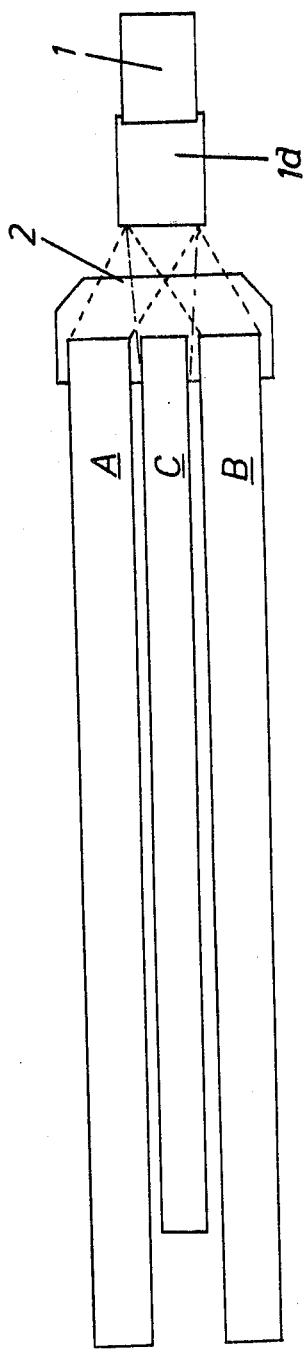
FIG. 1 illustrates schematically a plan view of the first part of a storage conveying system according to the present invention.

The present invention is hereinafter described with particular reference to a shingle of bacon provided by a bacon slicing machine illustrated at 1 in FIG. 1 of the drawings. Such machine may be a conventional slicing machine by which the bacon is continuously sliced by a rotating cutter knife as is well known in the art.

The present invention is however not exclusively limited to the application to bacon slicers although as will appear from the following description it is particularly suitable for use with a bacon processing line.

Figure 2:
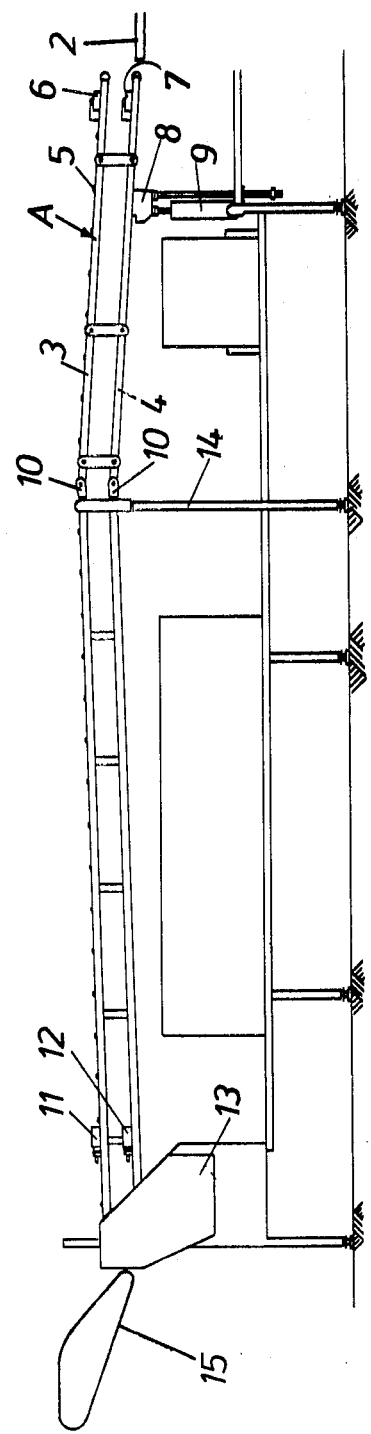
FIG. 2 is a side elevation of part of the conveyor as illustrated in FIG. 1.
Figure 3:
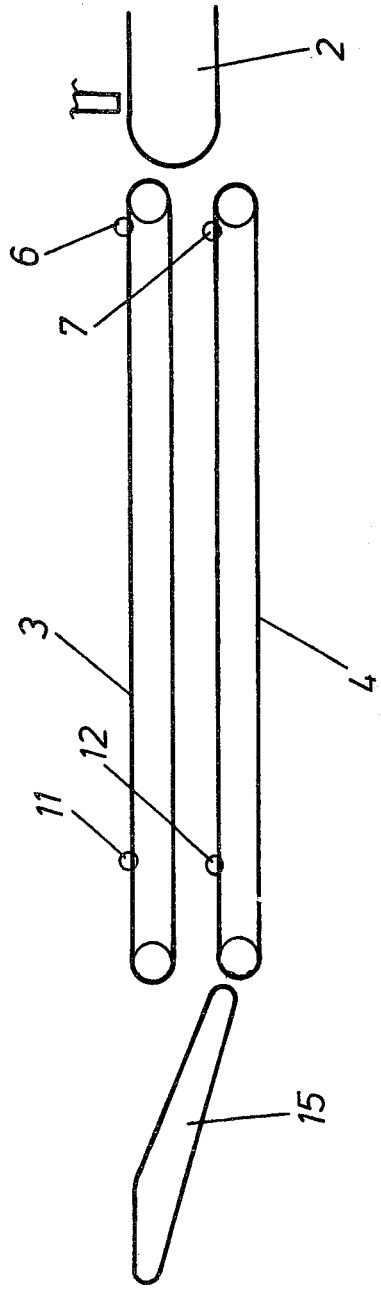
FIG. 3 is a schematic side view showing the photoelectric cells for use with the conveyor as illustrated in FIGS. 1 and 2.
Figure 4:
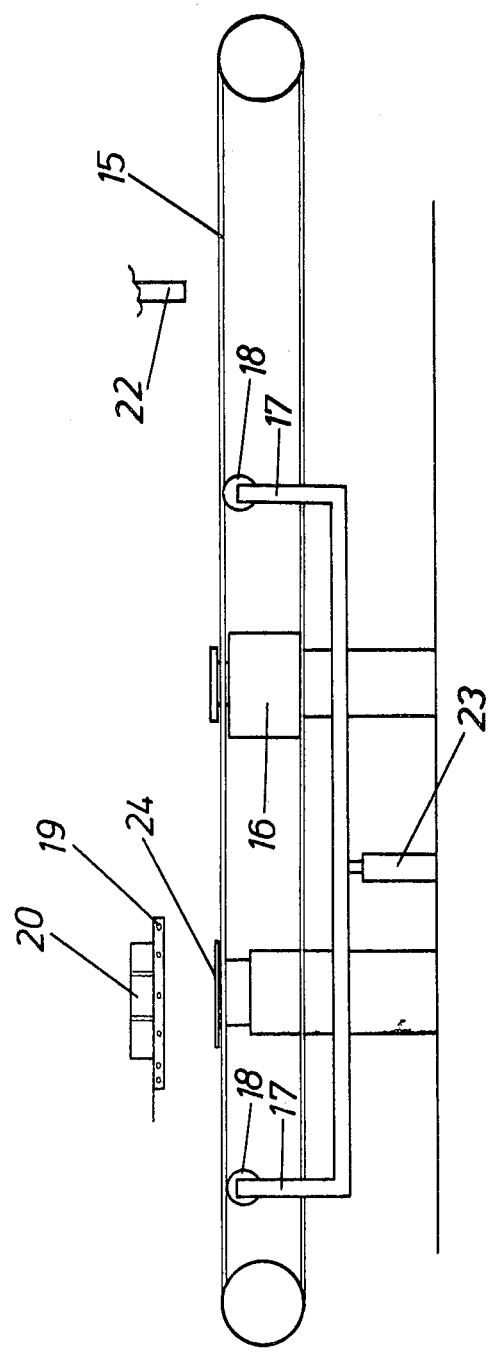
FIG. 4 is a schematic plan view showing the disposition of the components for weighing foodstuffs according to the present invention.

The shingle of bacon sliced by the machine 1 is fed on to take up conveyor 1a. The take up conveyor delivers the shingle to a divider 2 which feeds conveyors A, B and C. Conveyors A and B feed separate processing lines and conveyor C may be provided for conveying bacon of another quality which may be common to lines A and B. Conveyor C is therefore optional and may be omitted if not required. Desirably, the shingle from the bacon slicing machine portions the shingle by an acceleration of take up conveyor 1a in a jump fashion so that discreet intervals between the shingle are provided so as to portion the sliced bacon. The portions of bacon may be fed manually by switching the divider 2 so that the shingle is fed first to conveyor A and then on to conveyor B and so forth. Alternatively an automatic switching device may be provided to activate the divider 2. The bacon is then fed to one or other of the upper or lower conveyors 3 and 4 as illustrated in FIG. 2 in which the conveyor line A only is illustrated in side view. The conveyors 3 and 4, each have a receiving end which may be brought into line with divider 2 by raising or lowering the conveyors 3 and 4 by a pneumatic or hydraulically operated piston cylinder device 9 operating through a collar 8 connected to the conveyor 4. Both conveyors 3 and 4 are hinged at 10 to the remaining part of the conveyor which extends to the left hand as viewed in FIG. 2.

The conveyors are of conventional form having spaced freely rotational rollers 5 and have a moving belt driven by motor housed in a housing 13 at the left hand end of the conveyor. At the receiving end of the conveyors 3 and 4 there are provided photoelectric cells respectively 6 and 7 and at the delivery end of the said conveyors are further photoelectric cells 11 and 12 for purposes hereinafter described.

It will be appeciated that when the first portion of bacon is delivered to conveyor 4 it actuates photoelectric cell 7. Photoelectric cell 7 is in circuit with photoelectric cell 11 of conveyor 3 and photoelectric cell 6 of conveyor 3 is in circuit with photoelectric cell 12 of conveyor 4. The photoelectric cells 11 and 12 are connected to a timing out device such that if the cells are not actuated within a certain period of time the timing out device operates to activate the pneumatic or hydraulic device 9 to switch the conveyors from receiving on either conveyor 3 or conveyor 4 or vice versa.

Thus, in a specific example, if the conveyor 4 is adapted to receive the first package of bacon the photoelectric cell 7 is actuated and since photoelectric cell 11 has not been actuated it is timed-out and immediately the conveyor switches over so that conveyor 3 now receives bacon from the slicer. While the photoelectric cells 11 and 12 are timed-out they are adapted to ensure that the conveyors 3 and 4 are driven at high speed, but when they are being actuated they are adapted to drive the conveyors 3 and 4 at a relatively lower speed. Thus the first package of bacon delivered by conveyor 4 is driven along the conveyor 4 at a relatively high speed until it actuates the photoelectric cell 12 and this it will do to prevent photoelectric cell 12 from timing-out while the next package of bacon has been delivered to conveyor 3 and has actuated photoelectric cell 6.

Thus, the conveyor stays in a position of receiving bacon at photoelectric cell 6 until such time as the first package of bacon has passed through photoelectric cell 12 and that has timed-out, at which time the pneumatic device 9 will operate again and raise the conveyor until conveyor 4 is receiving bacon and photoelectric cell 11 is actuated.

Meanwhile, the packages of bacon on conveyor 3 will continue to move along conveyor 3 and as each package passes photoelectric cell 11 it will continue to actuate it. When the last of said packages has passed photoelectric cell 11 it will time-out and again the pneumatic device 9 will operate and lower so as to bring conveyor 3 in a position to receive the sliced and shingled bacon. At this point a plurality of packages of bacon will be moving along conveyor 4 and will be actuating photoelectric cell 12 until the last of said packages passed by photoelectric cell 12 timed-out and the conveyors again switch over.

This process is repeated ensuring that there is always a supply of bacon on either conveyor 3 or 4 and that a supply of bacon is being regularly and uniformly delivered to take off conveyor 15.

The motor in housing 13 driving the conveyors will normally be a DC shunt wound motor driving through an electric clutch and brake unit. The motor is desirably controlled by a thyristor unit with a variable high and low speed selection. The high speed for accepting the bacon and the low speed for discharging the bacon from the conveyor is obtained by switching the motor controller to whichever is required. The continuous discharge is obtained by energising the clutch and the intermittent acceptance is obtained by energising and de-energising the clutch and brake. When discharging the conveyor motor is held at high speed by a relay energised by its own contacts. It will be appreciated that this circuit is broken when photoelectric cells 11 and 12 are de-energised, i.e. when the first pack interrupts the beam. The relay de-energisation and the motor controller switches again to allow speed operation.

It will also be appreciated that photoelectric cells 11 and 7 and 12 and 6 are wired in series so that when both units are activated the conveyor will be raised or lowered by the pneumatic cylinder 9.

In order to effect a changeover of the conveyors a micro switch is opened or closed dependent upon the position of the conveyors and this switch reverses the drive system. For example, with the conveyors in the down position, that is to say with conveyor 3 receiving, the micro switch contacts will be open and the motor for conveyor 3 will then be driving at high speed with the clutch de-energised and the brake energised. The lower conveyor 4 will be driven at low speed by the motor with the clutch energised and the brake de-energised. When the conveyors change over such that conveyor 4 is in the position to receive from conveyor 2 the micro switch contacts will be closed such that conveyor 3 is then being driven at low speed with the clutch energised and the brake de-energises while conveyor 4 will be driven at high speed with the clutch de-energised and the brake energised.

The bacon having been delivered from either conveyor 3 or 4 on to the take off conveyor 15 passes then to the weighing station and the bacon is then delivered along the conveyor at a suitable speed. The take off conveyor 15 is formed of a plurality of parallel belts spaced a uniform distance apart. The conveyor 15 is driven by a driving roller 24 and runs over the lift mechanism comprising a generally U-shaped member 17 having freely rotatable rollers 18 at its upper end. The member 17 is adapted to be raised and lowered by a pneumatically operated piston and cylinder device 23. Located between the parallel belts forming conveyor 15 are fingers connected to a weigh pan 16 and further fingers connected to a stationary platform 24. It will be appreciated that if the U-shaped member 17 is raised to its uppermost position that the belt 15 is adapted to run over the rollers 18 in such a position that the upper surface of the belt 15 is above the level of the fingers and weighpan 16 and platform 24. It will also be appreciated that if the pneumatic piston and cylinder device 23 is operated to lower the U-shaped member 17 that the fingers then of the weighpan 16 and the stationary platform 24 will be above the level of the belts forming conveyor 15 and if the lower operation takes place when a package is over the fingers of weighpan 16 or stationary platform 24 that said package will then be deposited on to the fingers at 16 or 24 as the case may be and the package will no longer be conveyed by conveyor 15.

At the same time conveyor 15 can run continuously and thus an interruption in the conveying process is obtained without having to interrupt the drive to said conveyor 15.

The first package of bacon is received on to conveyor 15 and passes beneath the photoelectric sensor 22 which operates the lift of U-shaped member 17 and the belt is raised above the weighpan fingers 16, the conveyor carrying the package along the conveyor and after a predetermined period of time, which is dependent upon the distance between the weighpan fingers 16 and the sensor 22 and the speed of movement of the conveyor 15, the sensor 22 times-out and lowers the U-shaped member 17 depositing the package on to the weighpan fingers 16. The package remains on the fingers 16 until a second package is delivered to conveyor 15 and this passes beneath sensor 22, activates the U-shaped member 17 and lifts the first package from the weighpan fingers 16 and transports it along the belt until the sensor 22 times-out for the second time and then deposits the first package on to the stationary platform 24 and at the same time deposits the second package on to the weighpan fingers 16.

While the first package was on the weighpan fingers 16 the weight of the package was ascertained by the weighing mechanism hereinafter described and a light was energised on a panel 19 above which are trays 20 containing make weight pieces of the necessary foodstuff. The weight is ascertained by the weighing means such that a predetermined range of make weight pieces in selected trays 20 are provided giving a visual indication to an operative by the light energised on panel 19 as to which of the trays 20 it is necessary for the operative to select the required make weight piece and add it to the package when it becomes stationary on the fixed platform 24. When the third package is received on the conveyor 15 it too energises the sensor 22 raising the U-shaped member 17 and thus lifting the first package off the fixed platform 24 and conveying it to a packaging locality. The cycle is repeated so long as sensor 22 senses a package on the conveyor 15. It will be appreciated that during the time taken to convey the package from the weighing station 16 to the stationary platform 24 the operative has time to physically pick up the indicated make weight piece from the indicated tray 20 and have it ready to deposit on the package when the said package becomes stationary at platform 24. The light remains on on panel 19 until the next package is deposited on to the weighpan fingers 16. It will also be appreciated that it is a relatively easy task for an operative to collect a make weight piece from a tray which is indicated by a light on panel 19.

In the packaging of bacon which is to be sold in packages of a minimum net weight of, say, 8 ounces, the packages received on the conveyor 15 may either by in excess of the 8 ounces, in which case a correct weigh light will indicate on panel 19 and the operative has no need to add a make weight piece when the package is stationary on platform 24, or the package may be underweight within a predetermined range depending upon the side of bacon and the nature of the shingle created by the slicing machine.

In a specific instance it may be necessary for the make weight pieces in the trays 20 to consist either of a quarter slice, a half slice or a three quarter slice of bacon and it will be appreciated that these make weight pieces can be prepared from another side of bacon and separately check weighed so that the make weight pieces in the three trays are of a sufficient weight to ensure that when added to the package at the platform 24 the package will be in excess of the minimum predetermined weight. It will be appreciated that the sensor 22 is conveniently a photoelectric cell with a time delay which energises when the light is interrupted. By suitable electric circuits response is arranged to be faster than pneumatic or mechanical circuits so that the weight of the package is sampled before the lift system operates.

The weighing cell 16 may be a linear variable differential transformer used with a classifier controller. The weight of the product when deposited on the cell 16 is deflected such that the linear variable differential transformer detects the extent of deflection and transmits an appropriate electrical signal proportional to the applied force. The classifier controller produces an analogue output signal which may be adjusted by suitable potentiometers to divide this signal into specified weight arrangements.

The lights on indicating panel 19 are illuminated according to which of the specified weight ranges are determined by the analogue computer. It will be appreciated that the foregoing description is of a conveying and weighing system particularly applicable to foodstuffs requiring to be packed in predetermined minimum weight packages which ensures a constant supply of packages to a weighing locality from an interrupted prime source of supply to the processing line and which furthermore provides for a simple and easy operator response weighing system whereby the operator merely selects make weight pieces from trays having indicating means associated therewith and that the package which requires the addition of that indicated make weight piece is presented and rendered stationary for a sufficient period of time for the operator to add make weight pieces to the package.

It is to be understood that while reference herein is primarily to determining a minimum weight for an article that the same apparatus and method of this invention may be used to check weigh for an overweight article should that be desirable. Equally the invention may enable both underweight and overweight to be indicated so that all articles packaged are within a predetermined weight range.

We claim:

1. Apparatus for the conveying and weighing of unit packages which are to be sold in predetermined weight quantities comprising a source of supply of packages, a pair of conveying devices, means for driving each of said conveyor devices at two different speeds with the first speed being faster than the second speed so that packages deposited on one of said conveying devices may be progressed towards the delivery end of said one conveying device at a faster speed than when said packages are discharged from said conveying device, means for positioning said conveying devices so that one only at a time is adapted to receive packages from said source of said supply and while said one conveying device is receiving packages from said source of said supply the other of said two conveying devices is delivering packages at its delivery end, means for receiving packages from one of the two said conveying devices at a time, a weighing device positioned along said receiving means, means for raising and lowering said receiving means for placing said packages on and removing same from said weighing device, a visual indicator operatively connected to said weighing device to the minimum predetermined weight enabling an operator to select an indicated predetermined make weight piece and add it to the package while the package is stationary and means thereafter for delivering the package at the predetermined minimum weight to a packaging station.

* * * * *